(12) United States Patent
Backus et al.

(10) Patent No.: US 7,681,494 B2
(45) Date of Patent: *Mar. 23, 2010

(54) DEVICE TO INJECT FOODS WITH SOLID OBJECTS

(75) Inventors: Alan L. Backus, Los Angeles, CA (US); Ron Popeil, Beverly Hills, CA (US)

(73) Assignee: Ronco Acquisition Corporation, New York, NY (US)

( * ) Notice: Subject to any disclaimer, the term of this patent is extended or adjusted under 35 U.S.C. 154(b) by 1751 days.

This patent is subject to a terminal disclaimer.

(21) Appl. No.: 10/705,331

(22) Filed: Nov. 10, 2003

(65) Prior Publication Data

US 2004/0194644 A1    Oct. 7, 2004

Related U.S. Application Data

(63) Continuation-in-part of application No. 10/375,220, filed on Feb. 27, 2003, now Pat. No. 6,840,161, which is a continuation of application No. 09/891,915, filed on Jun. 26, 2001, now Pat. No. 6,578,470.

(51) Int. Cl.
*A23L 1/00* (2006.01)
(52) U.S. Cl. .................... 99/345; 99/494; 99/450.7; 99/532
(58) Field of Classification Search ........... 99/345–347, 99/494, 450.7, 532–535, 516; 141/21, 25, 141/26, 352, 357; 222/209, 213, 215; 604/187, 604/218, 220–222, 227; 426/281, 282, 92, 426/102, 89, 518
See application file for complete search history.

(56) References Cited

U.S. PATENT DOCUMENTS

| 390,170 A | 9/1888 | Humaston |
| 774,994 A | 11/1904 | Peter |
| 916,441 A | 3/1909 | Hachmann |
| 921,980 A | 5/1909 | Hackman et al. |
| 1,155,139 A | 9/1915 | Felker |
| 1,883,829 A | 10/1932 | Skoverski |
| 1,917,137 A | 7/1933 | Marchio |
| 2,118,976 A | 5/1938 | Larkin |

(Continued)

FOREIGN PATENT DOCUMENTS

EP   1 269 861 A1   1/2003

(Continued)

OTHER PUBLICATIONS

Nonfinal Office Action for U.S. Appl. No. 09/891,915 dated May 24, 2002, 6 pages.

(Continued)

*Primary Examiner*—Timothy F. Simone
(74) *Attorney, Agent, or Firm*—Connolly Bove Lodge & Hutz LLP

(57) ABSTRACT

A device to inject solid materials into foods comprising a piston, a sleeve, and a penetrating tip. Embodiments are described with both segmented and unitary sleeves. Deformation of the tip during storage is minimized by biasing members which withdraw the piston from the tip when an embodiment is not in use. A method is described for flavoring foods with solid objects.

8 Claims, 6 Drawing Sheets

U.S. PATENT DOCUMENTS

| | | |
|---|---|---|
| 2,124,700 A | 7/1938 | Hartzell |
| 2,473,191 A | 6/1949 | Bettencourt |
| 2,776,634 A | 1/1957 | Morton |
| 2,784,682 A | 3/1957 | Clevenger |
| 2,822,571 A | 2/1958 | Johnson |
| 3,161,154 A | 12/1964 | Schott |
| 3,241,477 A | 3/1966 | Myron |
| 3,483,810 A | 12/1969 | Peters et al. |
| 3,754,469 A | 8/1973 | Gasior |
| 4,064,879 A | 12/1977 | Leibinsohn |
| 4,162,333 A | 7/1979 | Nelson et al. |
| 4,178,660 A | 12/1979 | Olney et al. |
| 4,211,160 A | 7/1980 | Bieser |
| 4,258,067 A | 3/1981 | Stoll |
| 4,414,885 A | 11/1983 | Kelly |
| 4,455,928 A | 6/1984 | Townsend |
| 4,641,573 A | 2/1987 | Gunn |
| 4,703,688 A | 11/1987 | Ochs |
| 4,729,589 A | 3/1988 | Puskar |
| 5,226,897 A | 7/1993 | Nevens et al. |
| 5,275,095 A | 1/1994 | Van Haren |
| 5,453,044 A | 9/1995 | Abler et al. |
| 5,881,640 A | 3/1999 | Raevsager |
| 5,900,265 A | 5/1999 | Rutherford |
| 6,117,467 A | 9/2000 | Huling |
| 6,399,128 B1 | 6/2002 | Ballesteros |
| 6,467,403 B1 | 10/2002 | Lagares-Corominas |
| 6,578,470 B2 | 6/2003 | Backus et al. |
| 6,692,783 B2 * | 2/2004 | Hunter ................ 426/281 |
| 6,840,161 B2 | 1/2005 | Backus et al. |
| 6,860,197 B2 * | 3/2005 | Gable .................. 99/538 |

FOREIGN PATENT DOCUMENTS

| | | |
|---|---|---|
| EP | 1 269 861 B1 | 3/2006 |
| JP | 63202345 | 8/1988 |

OTHER PUBLICATIONS

Final Office Action for U.S. Appl. No. 09/891,915 dated Dec. 10, 2002, 6 pages.

Nonfinal Office Action for U.S. Appl. No. 10/375,220 dated Oct. 31, 2003, 4 pages.

Final Office Action for U.S. Appl. No. 10/375,220 dated Jul. 1, 2004, 5 pages.

Search Report for European Patent Application No. 02090222.7 dated Oct. 15, 2002, 3 pages.

Examination Report for European Patent Application No. 02090222.7 dated Feb. 4, 2005, 4 pages.

Search Report for European Patent Application No. 04090426.0 dated Feb. 22, 2005, 3 pages.

Search Report for European Patent Application No. 05090330.1 dated Mar. 14, 2007, 6 pages.

Examination Report for European Patent Application No. 05090330.1 dated Jun. 3, 2008, 1 page.

* cited by examiner

DEVICE TO INJECT FOODS WITH SOLID OBJECTS

CROSS-REFERENCE TO RELATED APPLICATION(S)

This application is a continuation-in-part of application Ser. No. 10/375,220, filed Feb. 27, 2003, now U.S. Pat. No. 6,840,161 which is a continuation of application Ser. No. 09/891,915, filed Jun. 26, 2001 (now U.S. Pat. No. 6,578,470, issued Jun. 17, 2003).

FIELD OF INVENTION

The present invention is directed towards a device which injects foods with solid materials.

BACKGROUND OF THE INVENTION

There are several devices in prior US patent art which inject foods with solid materials. Among these are: U.S. Pat. No. 1,155,139 which teaches a device for curing, spicing and seasoning meats. This device has a segmented pointed tip which penetrates the meat in a closed configuration and then opens to allow solid materials to be injected within the meat.

U.S. Pat. No. 4,211,160 teaches a device for injecting solid spices and liquids into meats prior to cooking. The device comprises a pointed slug which caps a cylindrical tube which is filled through a reservoir with the ingredients to be injected. The slug penetrates the meat followed by the cylindrical tube. The slug then precedes the tube allowing the ingredients to enter the meat. The slug and the tube are then removed from the meat under spring pressure.

U.S. Pat. No. 4,703,688 discloses yet another device to inject fillings within sandwiches. This device works on a similar principle to the one disclosed in U.S. Pat. No. 1,155,139.

U.S. Pat. No. 6,117,467 shows a device which injects stuffings into meats. A pointed square tube containing a sliding cylindrical piston is described. The piston forces the stuffings through the tube and into the interior of the meat.

Each of these devices has shortcomings which may include, but are not limited to: difficulty in cleaning, inconvenient apparatus filling, complexity in use, and difficult fabrication.

SUMMARY OF THE INVENTION

Embodiments utilizing the present inventions may have an elongated sleeve containing a piston which tracks the inner wall of the sleeve and moves longitudinally within it. Capping one end of the sleeve is an opening segmented point. The piston may move within the sleeve to a point where one end of the piston is within the segmented point and is exposed through the point which is opened by piston pressure.

The sleeve may be unitary or may be divided into two or more parts, each connected by a screw type thread or by other means. Loading materials to be injected into foods may be accomplished by disassembling the sleeve and placing materials to be injected within one of the sleeve constituents, or by removing the piston and loading materials through one end of the sleeve, or by loading materials through a window in the side of the sleeve. In any case, materials are injected by the piston forcing materials within the sleeve out through the segmented point while the point is within the food being injected.

One or more resilient members bias the piston to withdraw from within the opened segmented point, which results in the segmented point being relaxed in a closed, not straining, position when the device is not in use.

DETAILED DESCRIPTION OF THE INVENTION

Figure 1:
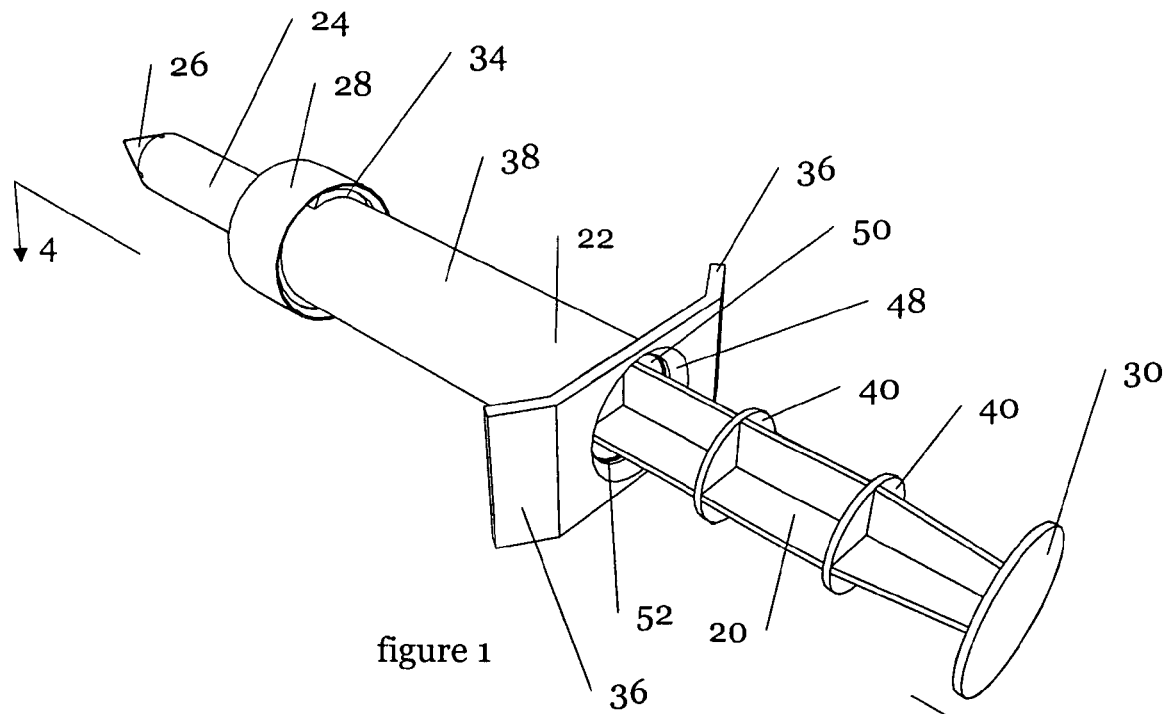
FIG. 1 is a rear perspective of a first embodiment of the present inventions.

Referring to FIGS. 1 through 5a, a first embodiment of the present inventions comprises piston 20, upper sleeve 22, lower sleeve 24 which includes integral segmented tip 26, and finger grip nut 28.

Figure 2:
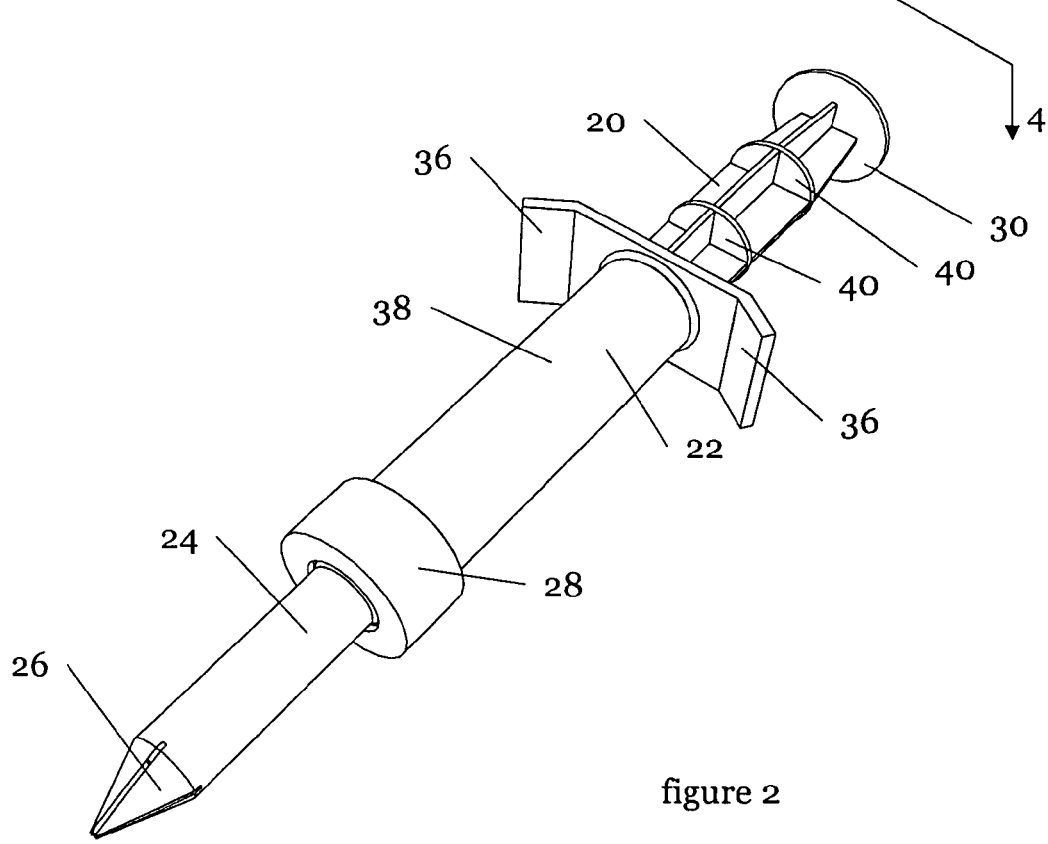
FIG. 2 is a front perspective view of the embodiment shown in FIG. 1.
Figure 3:
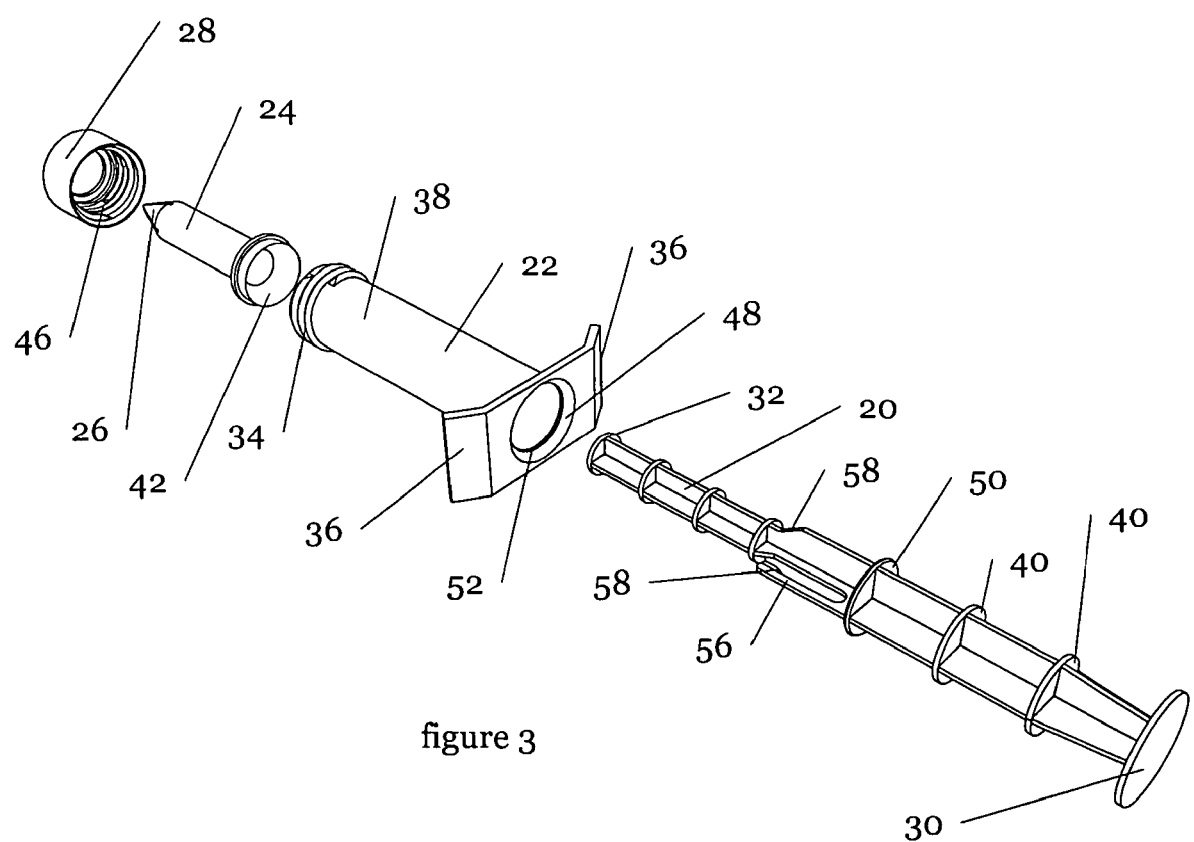
FIG. 3 is a rear perspective exploded view of the embodiment shown in FIG. 1.
Figure 4:
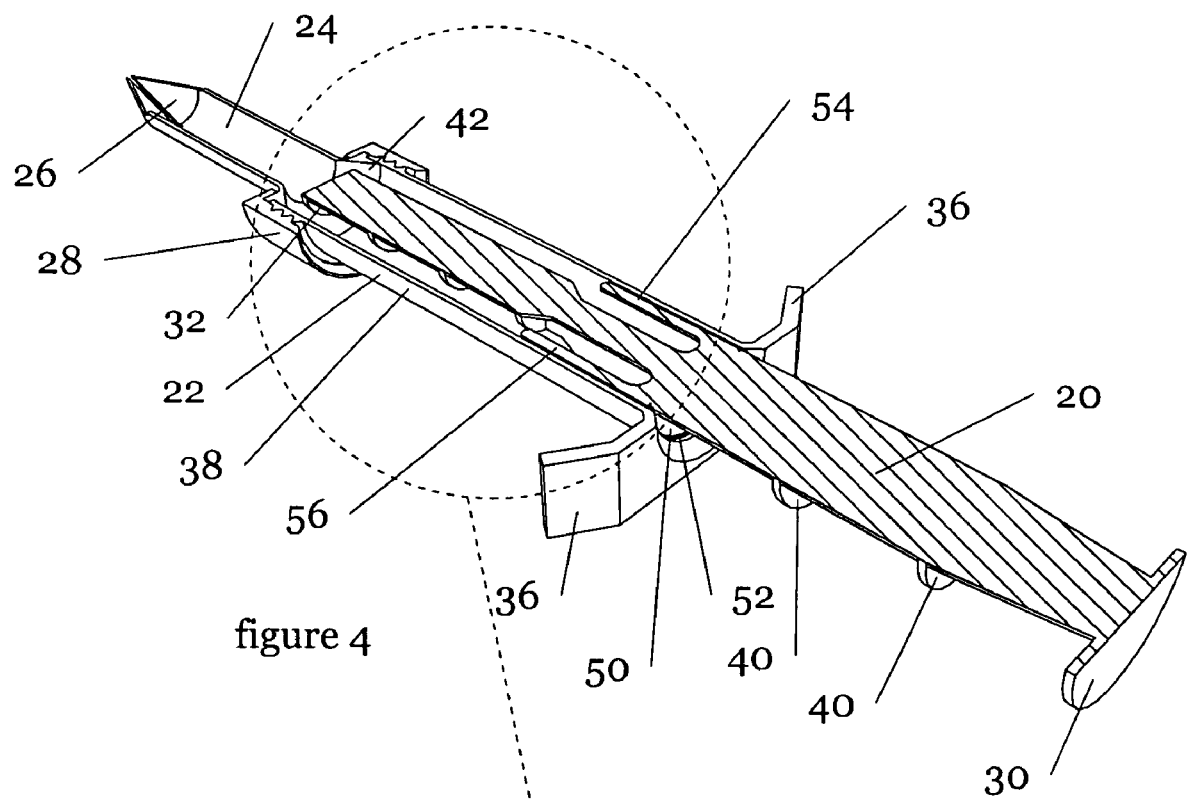
FIG. 4 is a cross-section, as indicated in FIG. 1, taken through the embodiment shown in FIG. 1 with the piston inserted into the sleeve but not depressed.
Figure 4A:
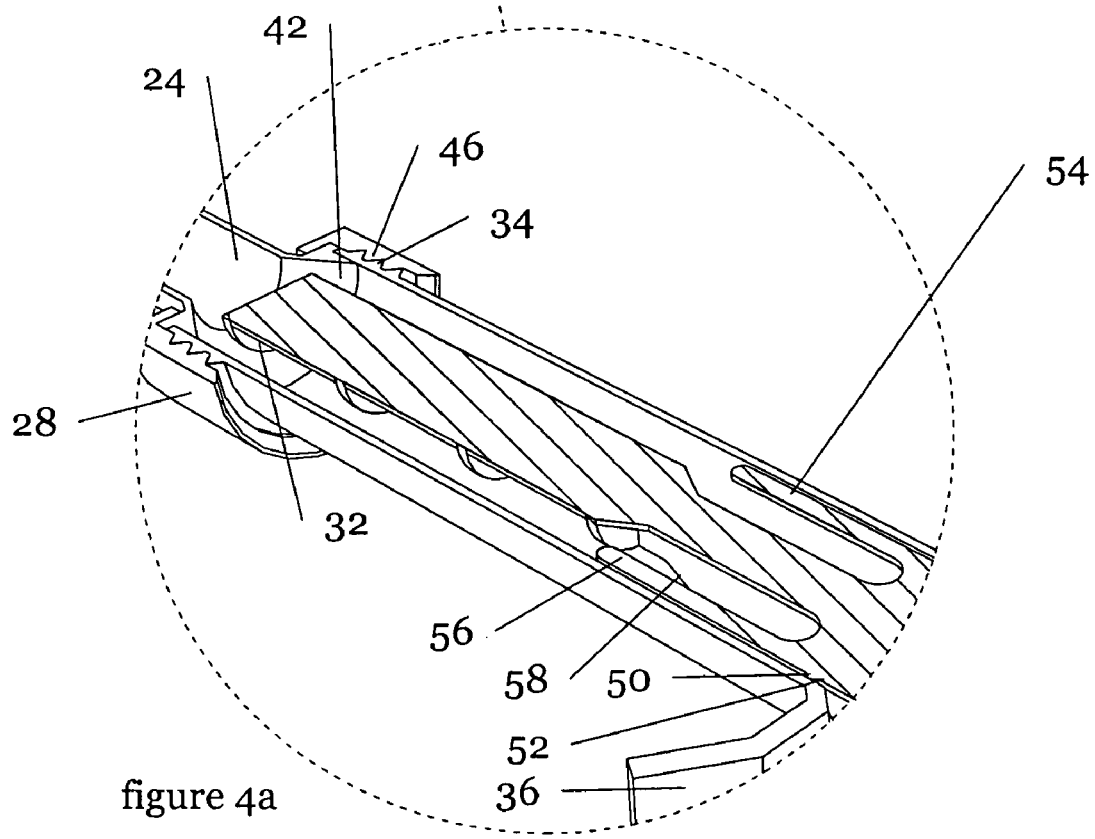
FIG. 4a is an enlargement of a portion of FIG. 4 as indicated in FIG. 4.
Figure 5:
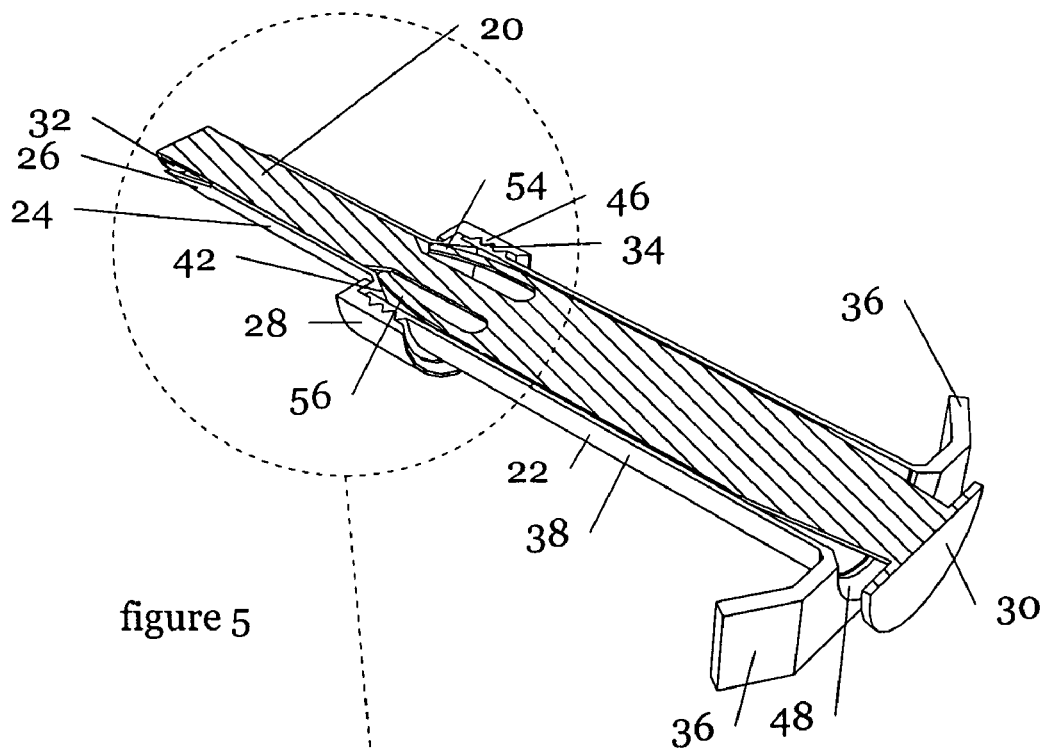
FIG. 5 is also a cross-section taken through the embodiment shown in FIG. 1 with the piston depressed.
Figure 5A:
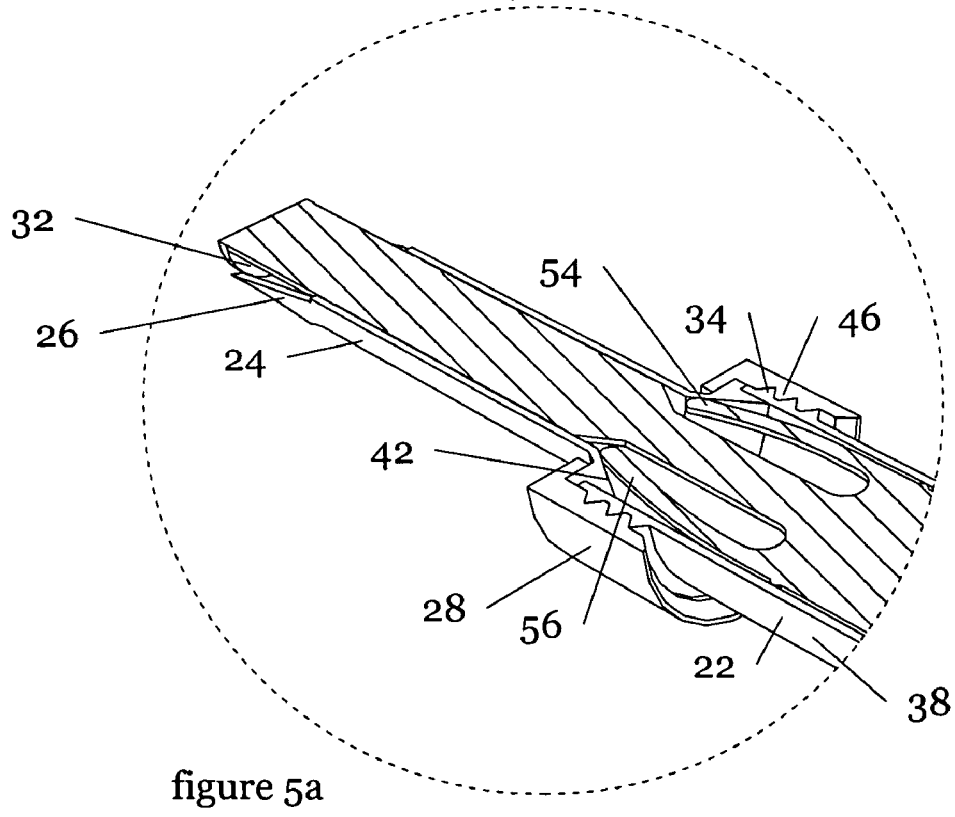
FIG. 5a is an enlargement of a portion of FIG. 5 as indicated in FIG. 5.

FIG. 3 shows an exploded view of the assembly of these parts. FIGS. 1 and 2 show exterior views of the first embodiment, and FIGS. 4 through 5a show sections taken through the first embodiment.

Each of the constituent parts of the first embodiment may be made by any suitable manufacturing means. As an example, and not by way of any limitation, each of the parts could be injection molded out of polypropylene, polycarbonate, or other suitable material.

Piston 20 is essentially a pair of orthogonally crossed ribs with several orthogonal disks spaced along its length and capping both its ends. Capping disk 30 acts as a finger pressure applicator to piston 20. Intermediate disks 40 may also be used to apply finger pressure to piston 20. Capping disk 32 presses against materials to be injected.

Upper sleeve 22 is essentially cylindrical tube 38 with attachment threads 34 at one end and finger holds 36 at its opposite end.

Lower sleeve 24 is essentially a cylindrical tube with conical entry 42 at one end and integral segmented tip 26 at its opposite end.

Finger grip nut 28 contains internal threads 46 which cooperate with attachment threads 34 to attach nut 28 to upper sleeve 22. Finger grip nut 28 may be knurled or contoured around its outer periphery to provide a better hand grip.

Lower sleeve 24 is attached to upper sleeve 22 by being trapped between finger grip nut 28 and upper sleeve 22 (see FIGS. 4 through 5a).

When capping disk 32 forces open segmented tip 26, resilient members 54 and 56 act in cooperation with conical entry 42 to withdraw capping disk 32 from forcing open segmented tip 26 once finger pressure is relaxed from capping disk 30 (see FIGS. 4 through 5a). This withdraw is also aided by segmented tip 26 pressing sloping surfaces against capping disk 32. This in turn results in less stress on the embodiment due to segmented tip 26 being closed when the embodiment is not in use.

This internal biasing to remove capping disk 32 from segmented tip 26 is facilitated by lower sleeve 24 being a smaller diameter than upper sleeve 22 which allows for conical entry 42 to exist.

Piston tapers 58 by contacting conical entry 42 prevent the end of piston 20 from traveling too far downward.

Piston 20 may be inserted into upper sleeve 22 through upper sleeve entry opening 48. Enlarged disc 50 has a greater diameter than other intermediate disks and cooperates with annular protrusion 52 to snap fit piston 20 within upper sleeve 22 and lower sleeve 24.

When disposed within sleeves 22 and 24, piston 20 may traverse freely up and down with a loose fit, which may be friction free enough to allow piston 20 to move under force of gravity alone up and down the sleeves.

At one end of such a movement, capping disk 32 may contact segmented tip 26 and under pressure from plunger 20 may force segmented tip 26 to open. If materials to be injected are in front of capping disk 32, they may also force segmented tip 26 to open.

Annular protrusion 52 acting in cooperation with enlarged disc 50 prevent piston 20 from accidentally being removed from upper sleeve 22 while still allowing piston 20 to be snapped free from upper sleeve 22 when force is added.

In use, finger grip nut 28 is removed from upper sleeve 22 by unscrewing internal threads 46 from engagement with attachment threads 34, and lower sleeve 24 is then detached from upper sleeve 22. Materials to be injected are then placed within lower sleeve 24 and lower sleeve 24 is then reattached to upper sleeve 22 by reversing the above described process.

Plunger 20 is then inserted into upper sleeve 22 through upper sleeve entry opening 48. Segmented tip 26 is then inserted into the food to be injected and finger pressure is applied to capping disk 30 resulting in the materials to be injected moving through lower sleeve 24 and into the food. Segmented tip 26 is then withdrawn from the food. This process may be repeated as often as is necessary to fully flavor the food as desired. Cleanup of the embodiment is facilitated by lower sleeve 24 being detachable from upper sleeve 22 resulting in greater accessibility to the interior of the embodiment.

Alternatively to load the embodiment, lower sleeve 24 may remain attached to upper sleeve 22 and piston 20 may be removed from upper sleeve 22 and materials to be injected inserted through upper sleeve entry opening 48 followed by plunger 20 being reinserted into upper sleeve 22. The injection procedures remain the same as described above.

Foods may be flavored by injecting flavor adding solid objects into them such as (only by way of example and not by any way of limitation): sun-dried tomatoes, olives, garlic, chopped onions, spices including parsley, rosemary, peppermint, and sage, hickory smoke; sugar, rock sugar, brown sugar, frosting, salt, rock salt, MSG, carrots, radishes, capers, ham, cheese, and many others.

To have foods flavored by solid objects a procedure may be used where an embodiment is loaded as described above, and then inserted into the food. The solid objects are then injected into the food and the embodiment is removed from the food and the food is then cooked and later eaten.

An additional step may be added by creating an insertion point for the embodiment by first penetrating the food with the tip of a knife.

Figure 6:
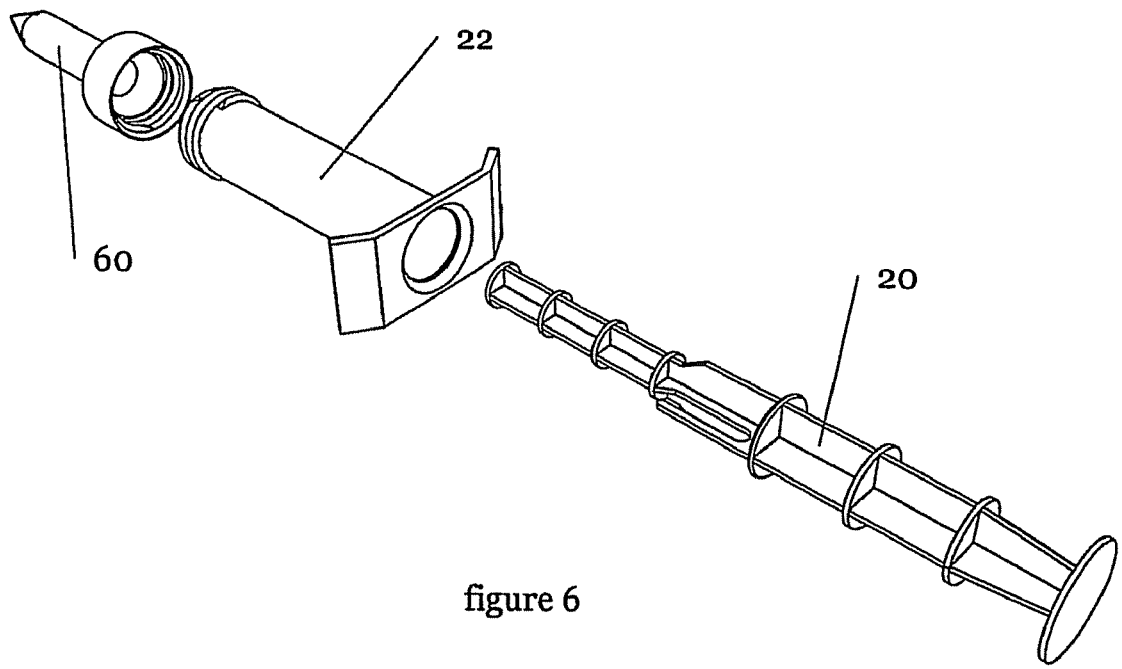
FIG. 6 is a rear perspective exploded view of a second embodiment.

FIG. 6 shows a second alternative embodiment which is identical to the first preferred embodiment except that the finger nut is integrated with the lower sleeve and the segmented tip to form an integrated tip 60.

Figure 7:
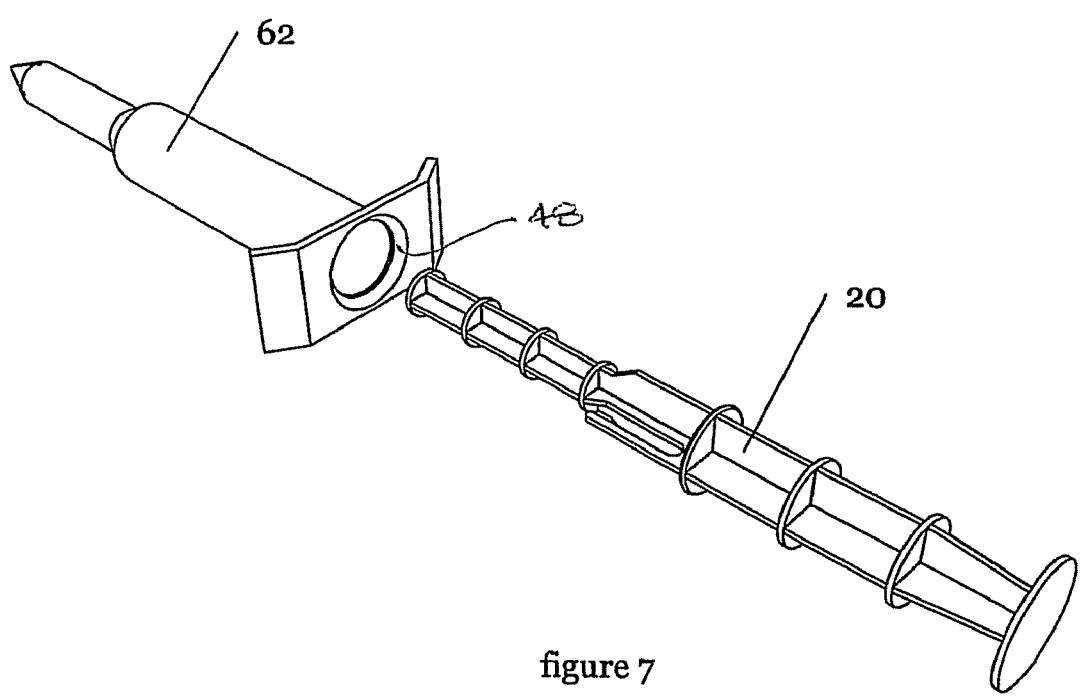
FIG. 7 is a rear perspective exploded view of a third embodiment.

FIG. 7 shows a third alternative embodiment which joins the integrated tip from FIG. 6 with the upper sleeve to form a unitized sleeve 62. This embodiment does not allow the lower sleeve (formerly referred to as 24) to be removed from the upper sleeve (formerly referred to as 22), and thus must be filled using only the second procedure described above, that of removing the piston and loading the embodiment through upper sleeve entry opening 48.

Figure 8:
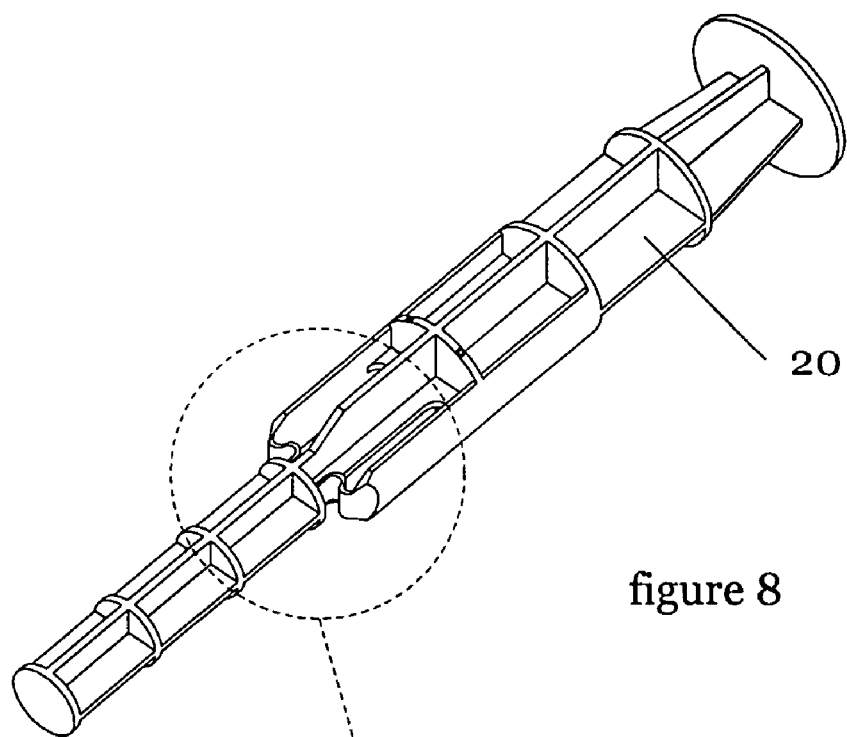
FIG. 8 is a forward perspective view of a design variant of the piston.
Figure 8A:
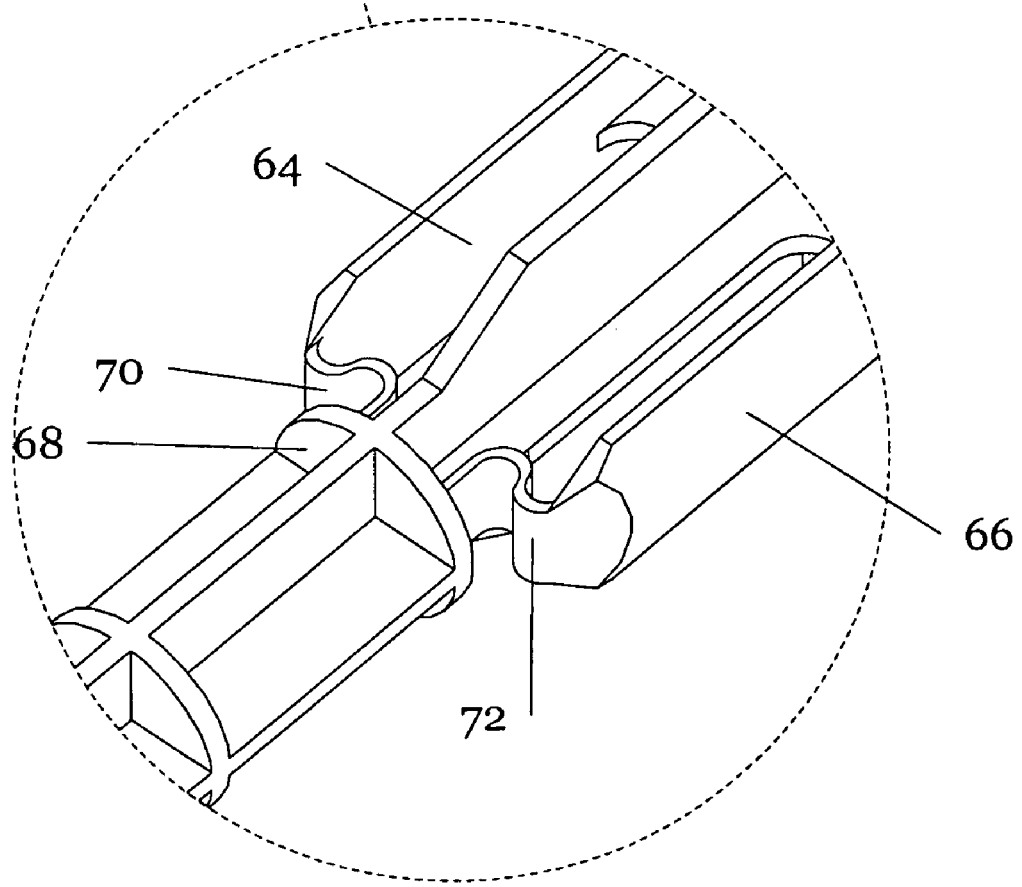
FIG. 8a is an enlargement of a section of FIG. 8 as indicated in FIG. 8.

FIGS. 8 and 8a show a modification to piston 20 where resilient members 54 and 56 are replaced with resilient members 64 and 66 which had been strengthened by expanding them vertically up and down and attaching the forward ends of resilient members 64 and 66 to disk 68 by means of springing members 70 and 72. This both strengthens the resilient members and provides more pressure for withdrawing capping disk 32 from segmented tip 26.

Besides being used for injecting flavors into foods, the embodiments may be used for other purposes. As examples, and not by way of any limitation, gravel might be injected into Styrofoam to enhance sound blocking, or fertilizer might be injected into the soil of houseplants. Embodiments also might be used for other reasons in cooking such as injecting sloppy Joe materials into unsliced bread, or injecting cheese inside of hamburgers to make cheese filled cheeseburgers.

What is claimed is:

1. A hand-held device for injecting solid materials into foods comprising:
    a hollow sleeve, the sleeve including one or more features connected thereto to permit holding the device in a user's hands;
    a penetrating tip on one end of the hollow sleeve;
    the penetrating tip having a first closed position and a second open position with the open position allowing materials within the hollow sleeve to exit the hollow sleeve through the tip; and
    a piston which longitudinally moves within the hollow sleeve, the piston including a feature connected thereto to permit user operation of the piston by hand;
    the piston forcing solid materials within the hollow sleeve to move the penetrating tip into the second open position to enable the solid materials to exit through the penetrating tip;
    a biasing member urging movement of the piston away from proximity with the penetrating tip when the piston is positioned within the sleeve to move the penetrating tip into the second open position.

2. The device of claim 1 wherein the sleeve features comprise finger holds projecting outwardly therefrom, and the piston feature comprises a flat end, where together the finger holds and flat end permit user movement of the piston within the sleeve by manual pressure.

3. The device of claim 1 wherein the penetrating tip comprises a segmented conical point.

4. The device of claim 1 wherein the biasing member presses against a conical section within the sleeve.

5. The device of claim 1 wherein the sleeve has two different cross sections.

6. The device of claim 1 wherein the sleeve is divided into at least two separable sections.

7. The device of claim 6 wherein the sleeve may be separably divided without use of tools.

8. The device of claim 6 wherein the separable sections are connected with screw type threads.

* * * * *